United States Patent
Stumpf

(10) Patent No.: US 11,840,442 B2
(45) Date of Patent: Dec. 12, 2023

(54) SYSTEMS AND METHODS FOR AUTONOMOUS FUELING OF A VEHICLE

(71) Applicant: Fuelie Systems, Inc., Lewes, DE (US)

(72) Inventor: Thomas R. Stumpf, Chapel Hill, NC (US)

(73) Assignee: FUELIE SYSTEMS, INC., Lewes, DE (US)

( * ) Notice: Subject to any disclaimer, the term of this patent is extended or adjusted under 35 U.S.C. 154(b) by 632 days.

(21) Appl. No.: 16/654,615

(22) Filed: Oct. 16, 2019

(65) Prior Publication Data

US 2020/0122998 A1 Apr. 23, 2020

Related U.S. Application Data

(60) Provisional application No. 62/747,695, filed on Oct. 19, 2018.

(51) Int. Cl.
*B67D 7/04* (2010.01)
*H01Q 1/32* (2006.01)
*G05D 7/06* (2006.01)
*G05B 15/02* (2006.01)

(52) U.S. Cl.
CPC .......... *B67D 7/0401* (2013.01); *G05B 15/02* (2013.01); *G05D 7/0676* (2013.01); *H01Q 1/3208* (2013.01); *B67D 2007/0417* (2013.01); *B67D 2007/0442* (2013.01); *B67D 2007/0444* (2013.01); *B67D 2007/0474* (2013.01)

(58) Field of Classification Search
CPC .................................................. B67D 7/0401
USPC ........................................................ 700/283
See application file for complete search history.

(56) References Cited

U.S. PATENT DOCUMENTS

| | | | | |
|---|---|---|---|---|
| 5,573,066 A | * | 11/1996 | Vaillancourt | B67D 7/84 169/49 |
| 5,692,647 A | * | 12/1997 | Brodie | B60S 5/02 222/173 |
| 7,055,560 B1 | * | 6/2006 | Sexton | B60K 15/05 220/86.2 |
| 9,051,928 B2 | * | 6/2015 | Al-Jafar | F02M 25/08 |
| 2014/0263629 A1 | * | 9/2014 | McQuade | B67D 7/0401 235/381 |
| 2014/0305545 A1 | * | 10/2014 | Butler, Jr. | G07F 13/025 141/94 |
| 2015/0123462 A1 | * | 5/2015 | Kamradt | B67D 7/78 141/192 |

(Continued)

OTHER PUBLICATIONS

Bach, "Antenna Basics—Basic Antenna Design Considerations for EnOcean based Products" Application Note 102, EnOcean, 2011, 5 pgs. (Year: 2011).*

(Continued)

*Primary Examiner* — Emilio J Saavedra
(74) *Attorney, Agent, or Firm* — COATS & BENNETT, PLLC

(57) ABSTRACT

An autonomous fueling system to dispense fuel to a vehicle. The system may include a fuel dispenser configured to autonomously deliver fuel to a vehicle. A server may monitor the fueling event. The system may also include a user device configured to communicate with the fuel dispenser and/or the server to order the fuel. The dispenser may be configured to autonomously insert a nozzle into the fuel system of the vehicle and deliver the fuel.

20 Claims, 14 Drawing Sheets

(56) References Cited

U.S. PATENT DOCUMENTS

| | | | |
|---|---|---|---|
| 2015/0352947 A1* | 12/2015 | Hubschman | G01C 21/3469 |
| | | | 340/450.2 |
| 2017/0361761 A1* | 12/2017 | Salter | F21S 43/14 |
| 2018/0043767 A1 | 2/2018 | Zitkovic, Jr. et al. | |
| 2018/0075567 A1 | 3/2018 | Mycroft | |
| 2019/0295189 A1* | 9/2019 | Strasser | G06Q 20/18 |
| 2020/0158072 A1* | 5/2020 | Raasch | F02D 41/1497 |

OTHER PUBLICATIONS

Loy et al., "ISM-Band and Short Range Device Antennas" Texas Instruments Application Report SWRA046A, 2005, 38 pgs. (Year: 2005).*

Andysautosporttv, "Fuel Doors - Presented by Andy's Auto Sport" YouTube video accessed at https://www.youtube.com/watch?v=uTEWeuwmUqQ, published Jul. 16, 2013, 3:28 mins. (3 pgs of screen captures provided). (Year: 2013).*

* cited by examiner

SYSTEMS AND METHODS FOR AUTONOMOUS FUELING OF A VEHICLE

RELATED APPLICATIONS

This application claims priority to U.S. Provisional Application No. 62/747,695, filed 19 Oct. 2018, the disclosure of which is hereby incorporated by reference in its entirety.

BACKGROUND

Legacy manual, semi-autonomous, and fully autonomous vehicles (AVs) that are powered by internal combustion and or internal combustion electric hybrid vehicles are operating on roads as a combined fleet.

A human or artificially intelligent (AI) user who operates a manual or autonomous vehicle with an internal combustion engine as part of its drivetrain is required to periodically refuel. This usually includes driving to a gas station, parking near a fuel dispenser, getting out of the vehicle, and manually operating a fuel dispenser to dispense the fuel into the tank of the vehicle. There are many issues with this process.

It can be inconvenient or impossible for the user to exit the vehicle. A human user may be elderly or have an injury or disability. This could be a safety issue if the station is difficult to get to due to road construction or in a potentially dangerous location. For example, a human user driving on a highway at night may be required to stop at a gas station for fuel. The gas station may be in a neighbourhood that has a high crime rate. Alternatively, there may be persons at the station that are looking harass or impede travellers. Another reason that the human user may not want to exit the vehicle is because they may be traveling with small children. This user may desire to remain within the vehicle to attend to the children, or to prevent the children from becoming frightened if they were left alone within the vehicle. The AI user has none of the prior issues, but the randomness of human behaviour is a variable which causes difficulty for the AI user and as a result, potentially dangerous circumstances for the human user. Mixing AI users with human users at a traditional gas station in close proximity is problematic for both types of users. For example, a human user may suddenly step out from behind a pump in front of the AI user's autonomous vehicle after it has been refuelled. A fleet of AI based autonomous vehicles require autonomous fuelling sites dispersed in and around their area of operations. This would be preferably in parking lots near or at least their highest probability destination points. Due to changing demand, it would likewise be preferable if the autonomous refuelling equipment require no site development or infrastructure to operate.

Fuel dispensers are becoming more complicated making it more difficult for a user to dispense the proper type and amount of fuel. Current fuel dispensers often provide for multiple different grades of fuel with different octane ratings, as well as different compositions of fuel, such as ethanol-based fuel. The fuel dispenser can include multiple different dispensing nozzles and hoses to dispense these various fuels. It is often confusing for a user to select their desired type of fuel and dispense this into their vehicle.

A safer and more straight-forward and efficient process is needed for addressing these issues for dispensing fuel for both legacy manual vehicles as well as for new AI based autonomous vehicles.

SUMMARY

One aspect is directed to a method of autonomously dispensing fuel to a vehicle. The method comprises: receiving a wireless request for fuel from a user; determining that the user has a valid account; determining that the vehicle ignition is off; in response to determining that the vehicle ignition is off, extending a fuel arm outward from a dispenser body and inserting a nozzle on the fuel arm into a fuel inlet on the vehicle; activating a pump and dispensing the fuel to the vehicle while the vehicle ignition is off; deactivating the pump; and retracting the arm towards the dispenser body and removing the nozzle from the fuel inlet of the vehicle.

In another aspect, the method further comprises detecting that the ignition of the vehicle is turned on while the nozzle is inserted into the fuel inlet and terminating the dispensing of fuel and swiftly and safely withdrawing the nozzle into protective storage.

In another aspect, the method further comprises receiving a signal from a passive coil RF device that is connected to a spark plug line of the vehicle and determining that the vehicle ignition is on.

In another aspect, a transmitter in the vehicle is powered by the vehicle ignition wire and signals to a remote source that the vehicle is turned on.

In another aspect, the method further comprises receiving the signal from the passive coil RF device and/or an ignition powered transmitter through a quarter wave antenna.

In another aspect, the method further comprises receiving signals from a control unit of a fuel door assembly on the vehicle and determining that the vehicle ignition is off.

In another aspect, determining that the user has a valid account comprises signalling a remote server through a wireless communication network and determining that the user has previously created an account.

In another aspect, the method further comprises transmitting signals to a remote server after dispensing the fuel with the signals comprising an amount of fuel dispensed to the vehicle, a date and time of dispensing the fuel to the vehicle.

In another aspect, the method further comprises sensing that the vehicle is in proximity to the dispenser by receiving a signal from the vehicle that the vehicle ignition is on.

In another aspect, the method further comprises sensing lights on a fuel door assembly of the vehicle and determining a position of the vehicle relative to the dispenser.

In another aspect, the method further comprises extending the fuel arm outward from a main dispenser; engaging the nozzle of the fuel arm with an extension on a door of the fuel inlet; and inserting the fuel arm into the fuel inlet of the vehicle.

One aspect is directed to a device to autonomously dispense fuel to a vehicle. The device comprises a dispenser body, a fuel arm movably connected to the dispenser body, a pump to move the fuel through the fuel arm, and a processing unit. The processing unit is positioned within the dispenser body and configured to: receive a wireless request for fuel from a user; determine that the vehicle ignition is off; extend the fuel arm outward from the dispenser body and inserting the nozzle into a fuel inlet on the vehicle; activate the pump and dispense the fuel through the fuel arm; and deactivate the pump and retract the fuel arm towards the dispenser body upon determining that the ignition of the vehicle is turned on.

In another aspect, the method further comprises receiving a signal from a passive coil RF device that is connected to a spark plug line of the vehicle and determining that the vehicle ignition is on.

In another aspect, a quarter wave antenna is positioned with the dispenser body with the quarter wave antenna configured to receive a signal from a passive coil RF device in the vehicle when the ignition of the vehicle is on.

In another aspect, a sensor is mounted on the fuel arm with the sensor configured to detect lights on a fuel door assembly of the vehicle.

In another aspect, sensors are mounted on the dispenser body with the sensors configured to sense a position of the vehicle.

One aspect is directed to a fuel filler door assembly that is mounted to a body of a vehicle. The fuel filler door assembly includes a body with an opening that aligns with a neck of fuel tank within the vehicle. A door is movably connected to the body and movable between a closed position that extends across the opening and an open position with the door pivoted away from the opening. The body is mounted to the vehicle with an outer side of the body flush with the outer side of the body of the vehicle.

The fuel filler door assembly can also include lights mounted to the body and positioned around the opening.

The fuel filler door assembly can also include a lock attached to the inner side of the body and movable between a locked position to prevent the door from moving from the closed position to the open position and an open position to allow the door to move from the closed position to the open position.

One aspect is directed to a method of attaching a fuel filler door assembly to a vehicle. The method includes attaching a body to the vehicle with an opening in the body aligned with a neck of a fuel tank and with a door that extends across the opening being exposed on the exterior of the vehicle.

In another aspect, a self-sealing fuel cap may be installed on the fuel inlet tube designed to assist and permit insertion of the distal end of the fuel nozzle without removing the self-sealing cap. This self-sealing cap may have a funnel shaped opening to guide the nozzle insertion and spring assisted doors so it may be left in place for both manual and autonomous fueling by the user.

The method can also include positioning the body relative to the vehicle with an outer side of the body being flush with an outer side of a body of the vehicle.

The method can also include positioning the door to be outward beyond the body.

One aspect is directed to a method of fueling a vehicle. The method includes activating a control circuit and moving a latch of a fuel filler door assembly to an open position. The method includes moving a fuel nozzle towards the fuel filler door assembly. The method includes sensing lights that extend around a door of the fuel filler door assembly and aligning the nozzle relative to the door. The method includes contacting the distal end of the nozzle against the door and pivoting the door away from an opening. The method includes inserting the nozzle into a neck in the fuel tank and dispensing fuel through the nozzle and into the neck and the fuel tank.

DETAILED DESCRIPTION

Figure 1:
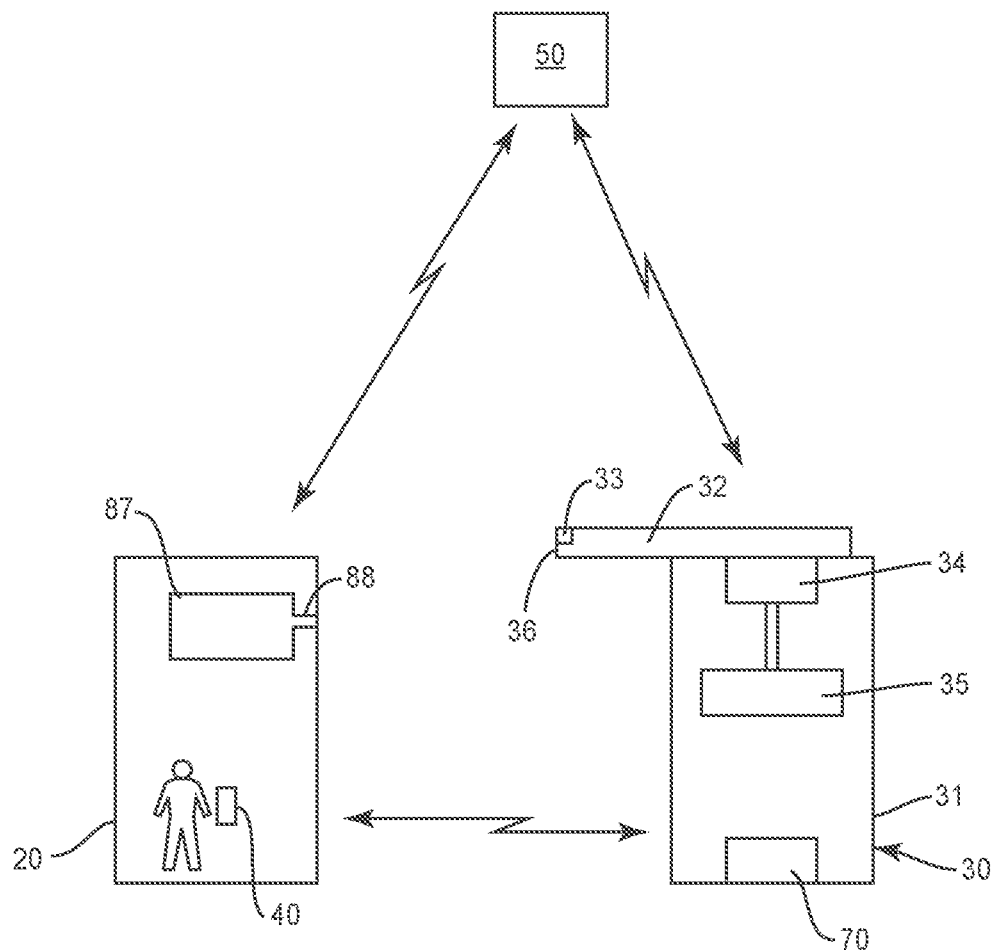
FIG. 1 is a schematic diagram of an autonomous fueling system.

FIG. 1 schematically illustrates an autonomous fueling system 10. The system 10 includes a fuel dispenser 30 configured to autonomously deliver fuel to a vehicle 20. A server 50 monitors the fueling event. The system 10 also includes a user device 40 configured to communicate with the fuel dispenser 30 and/or the server 50 to order the fuel. The dispenser 30 is configured to autonomously insert a nozzle into the fuel system of the vehicle and deliver the fuel.

The fuel dispenser 30 is configured to autonomously dispense fuel to the vehicle 20. The fuel dispenser 30 includes a body 31 and a movable arm 32. Fuel is delivered to the arm 32 from a tank 35 positioned in the body 31 or positioned at a nearby location such as an above ground or an underground storage tank. One or more pumps 34 are configured to move the fuel from the tank 35 to the arm 32 and out through a nozzle 36 at an end of the arm 32 and into the vehicle 20. One or more sensors 33 can be positioned at the nozzle 36 to sense the location of the arm 32 and nozzle 36 relative to the vehicle 20.

Figure 2:
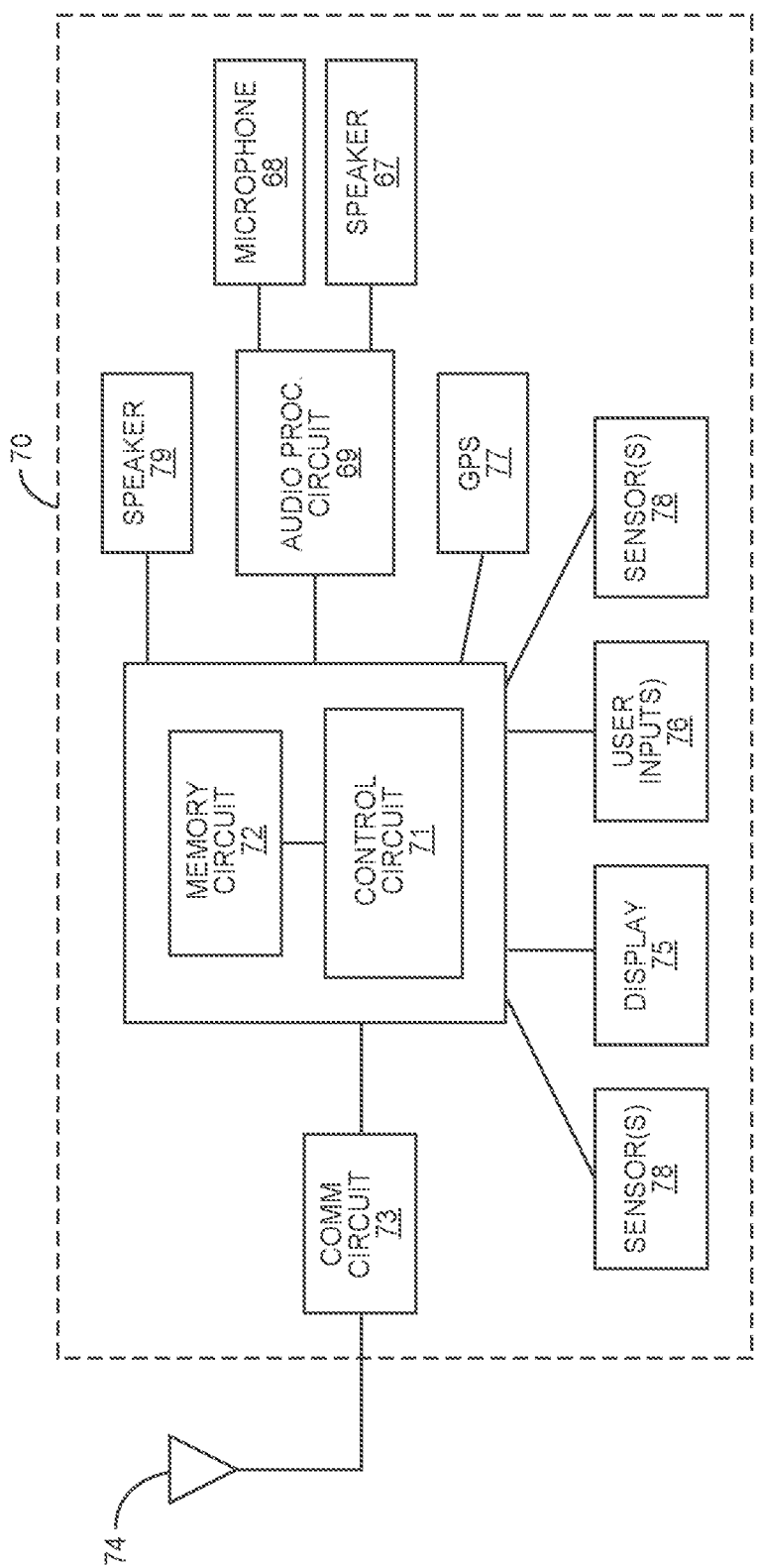
FIG. 2 is a schematic diagram of a processing unit of a fuel dispenser.

The fuel dispenser 30 further includes a processing unit 70 to control the operation. FIG. 2 illustrates a block diagram of a processing unit 70. The processing unit 70 includes a control circuit 71 that controls the overall functioning of the fuel dispenser 30. The control circuit 71 can include one or more microprocessors, microcontrollers, Application Specific Integrated Circuits (ASICs), or other programmable devices. The control circuit 71 can be configured to execute program code stored within the fuel dispenser 30 or accessible by the device, to control the various components and their functions. For example, the program code can be stored in memory circuit 72 or can be downloaded from the server 50.

Memory circuit 72 can include one or several types of non-transitory memory, including, for example, read-only memory, flash memory, magnetic or optical storage devices, or the like. In some embodiments, one or more physical memory units can be shared by the various components. Other embodiments can have physically separate memories for one or more of the different components.

A communications circuit 73 can be configured to wirelessly access the monitoring server 50, the user device 40, and components associated with the vehicle 20. The communications circuit 73 can include a radio frequency transmitter and receiver for transmitting and receiving signals through an antenna 74. The communications circuit 73 can be further configured to send and receive information through various formats, such as but not limited to near-field communications, SMS text messages and files.

A display 75 can be included on the body 31 to provide viewable information for the user, such as the type of fuel, amount of fuel dispensed, and the cost. The display 75 can also display information about the positioning of the vehicle 20 relative to the fuel dispenser 30 during the initial approach of the vehicle 20. The display 75 can include any known electronic display, such as a liquid crystal display. User inputs 76 can be positioned on the body 31 for the user to enter various commands and make menu selections for menus presented on the display 75. The user inputs 76 can include various devices, such as one or more control buttons, a keypad, touchpad, and/or a joystick.

A global positioning system (GPS) component 77 can be configured to receive coordinate information from various sources (e.g., satellites, base stations) to determine a geographic position of the vehicle 20.

One or more sensors 78 can be positioned to detect a position of the vehicle 20 relative to the fuel dispenser 30. These sensors 78 can include cameras or motion detectors that detect when the vehicle 20 is aligned at a position to receive fuel from the fuel dispenser 30.

The dispenser 30 can further includes a microphone 68, speaker 67, and an audio processing circuit 69. The audio processing circuit 69 is configured to provide audio processing functionality for processing voice data for communications through the speaker 67 and microphone 68. FIG. 2 includes separate communication and audio processing circuits 73, 69. One or both of the functionality performed by these circuits 73, 69 can be included within the control circuit 71.

Figure 3:
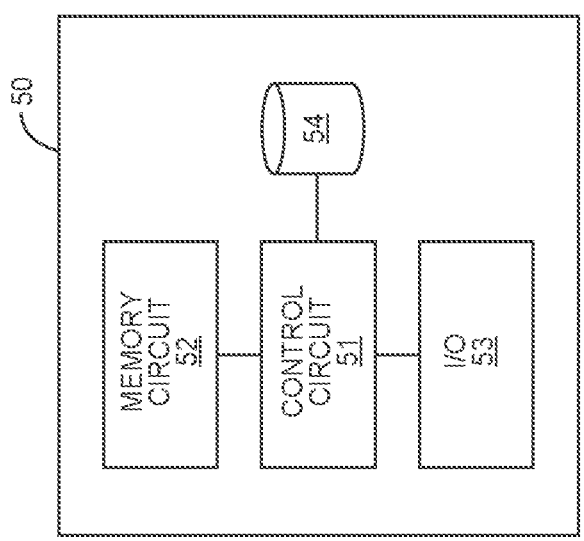
FIG. 3 is a schematic diagram of a server.

The monitoring server 50 is in communication with one or both of the fuel dispenser 30 and the user device 40. FIG. 3 illustrates an example monitoring server 50 that includes a control circuit 51 that can include one or more microprocessors, microcontrollers, hardware circuits, and/or a combination thereof. Memory circuit 52 stores program code used by the control circuit 51. Memory circuit 52 can include various memory devices such as random access memory, read-only memory, and flash memory. A database 54 can be included in the memory circuit 52, or in a separate memory unit (e.g., a magnetic or optical disk drive). The database 54 can be local or remote relative to the monitoring server 50. Thus, in one or more embodiments the database 54 is accessible to the monitoring server 50, but is stored externally on a separate server. One or more input/output (I/O) interfaces 53 enable wireless connectivity, such as through a PDN.

The user device 40 is configured for the user to authorize the fueling event. The user device 40 can include a variety of different computing devices, including but not limited to a mobile cellular telephone, a smart phone, a tablet, a laptop computer, and a personal digital assistant (PDA).

Figure 4:
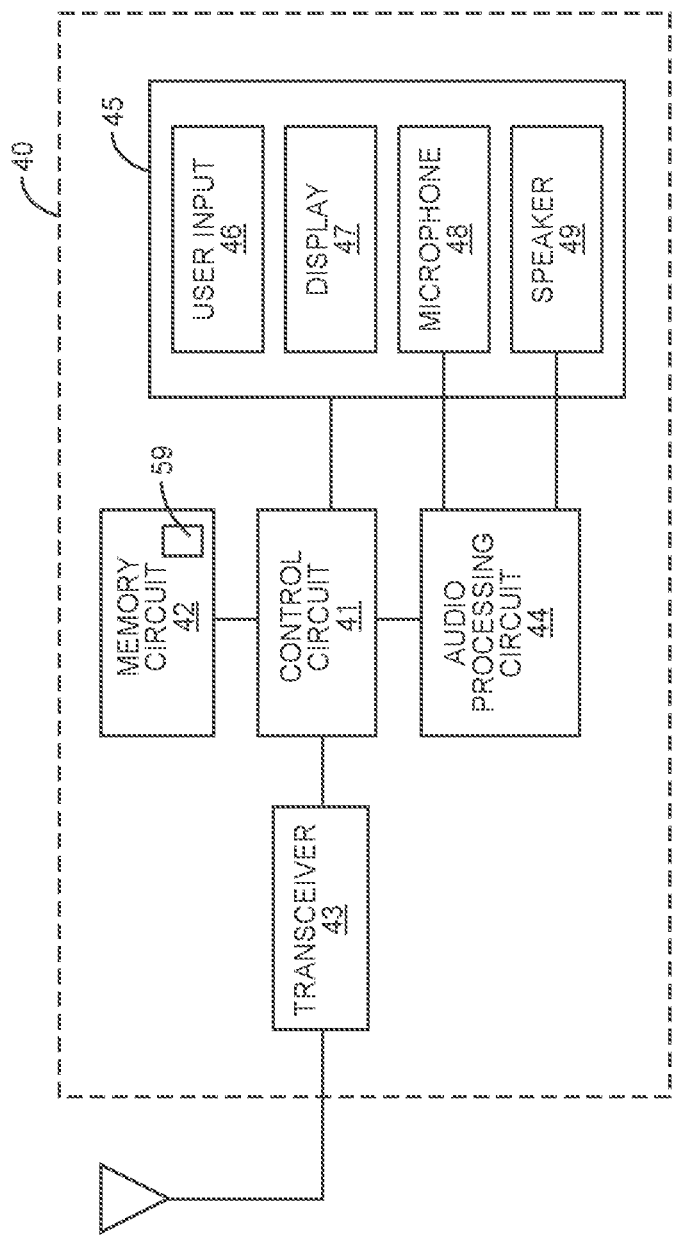
FIG. 4 illustrates a schematic block diagram of a user device 40

FIG. 4 illustrates a schematic block diagram of an exemplary user device 40. User device 40 includes a control circuit 41 that performs various processing tasks, including controlling the overall operation of the user device 40 according to programs stored in memory circuit 42. The control circuit 41 can include one or more microprocessors, microcontrollers, Application Specific Integrated Circuits (ASICs), or other programmable devices. The control circuit 41 can be configured to execute program code stored within the device 40 or accessible by the device 40, to control the various components and their functions. For example, the program code can be stored in memory circuit 42, or can be downloaded from the monitoring server 50.

Memory circuit 42 can include one or several types of non-transitory memory, including, for example, read-only memory, flash memory, magnetic or optical storage devices, or the like. In some embodiments, one or more physical memory units may be shared by the various components. Other embodiments may have physically separate memories for one or more of the different components.

To communicate with the monitoring server 50 and/or dispenser 30, user device 40 includes at least one transceiver 43 coupled to an antenna. Transceiver 43 can operate according to any known standard, such as Global System for Mobile Communications (GSM), TIA/EIA-136, cdmaOne, cdma2000, UMTS, Wideband CDMA, and Long Term Evolution (LTE). In addition, transceiver 43 can include baseband processing circuits to process signals transmitted and received by the transceiver 43. Alternatively, baseband processing circuits can be incorporated with control circuit 41.

A user interface 45 includes one or more user input devices 46 and a display 47 that enables the user to interact with and control the device 40. The user input devices 46 can include a keypad, touchpad, joystick, control buttons, other input devices, or a combination thereof. User input devices 46 allow the user to enter numbers, characters, or commands, and scroll through menus and select menu items presented to the user on an electronic display 47. The electronic display 47 allows the user to view information such as menus and menu items, dialed digits, images, call status information, and output from user applications (e.g., a web browser, or a dedicated application for accessing the monitoring server 30). User interface 45 can also include a microphone 48 and a speaker 49. An audio processing circuit 44 receives analog audio inputs from the microphone 48 and provides the basic analog output signals to speaker 49.

Figure 5:
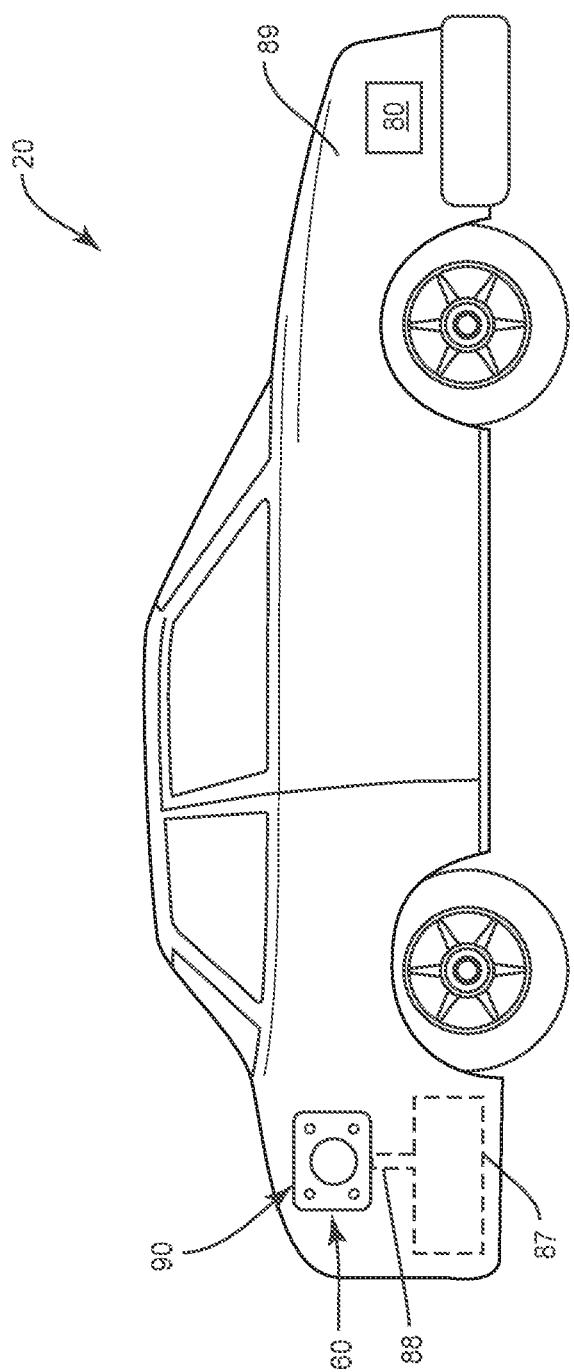
FIG. 5 is a schematic diagram of a vehicle.

Various types of vehicles 20 can be configured to autonomously receive fuel from the fuel dispenser 30. Examples include but are not limited to cars, trucks, farm equipment, and motorcycles. FIG. 5 illustrates a vehicle 20. The vehicle 20 includes a fuel inlet 88 that leads into the fuel tank 87. The vehicle 20 is equipped with a fuel filler door assembly 90 that is attached to the vehicle body 89 and extends over the fuel inlet 88. The fuel filler door assembly 90 includes an alignment system 60 to interact with the robotic arm 32 of the fuel dispenser 30. The alignment system 60 provides for autonomously aligning and inserting the nozzle 36 of the arm 32 through a self-sealing fuel cap and into the fuel inlet 88 to deliver fuel into the fuel tank 87.

Figure 6:
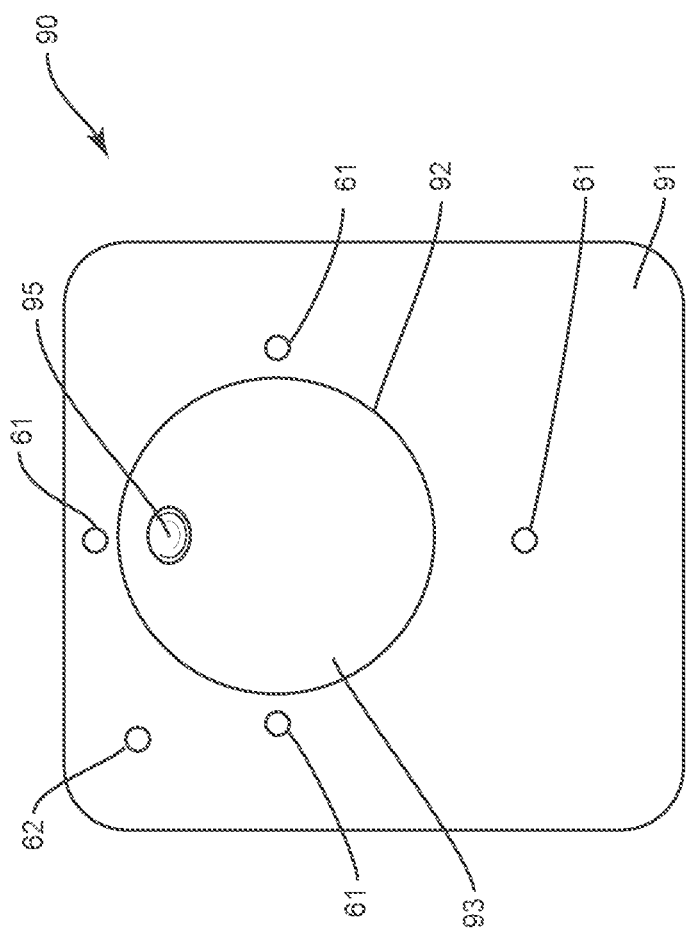
FIG. 6 is a front view of a fuel door assembly.
Figure 7:
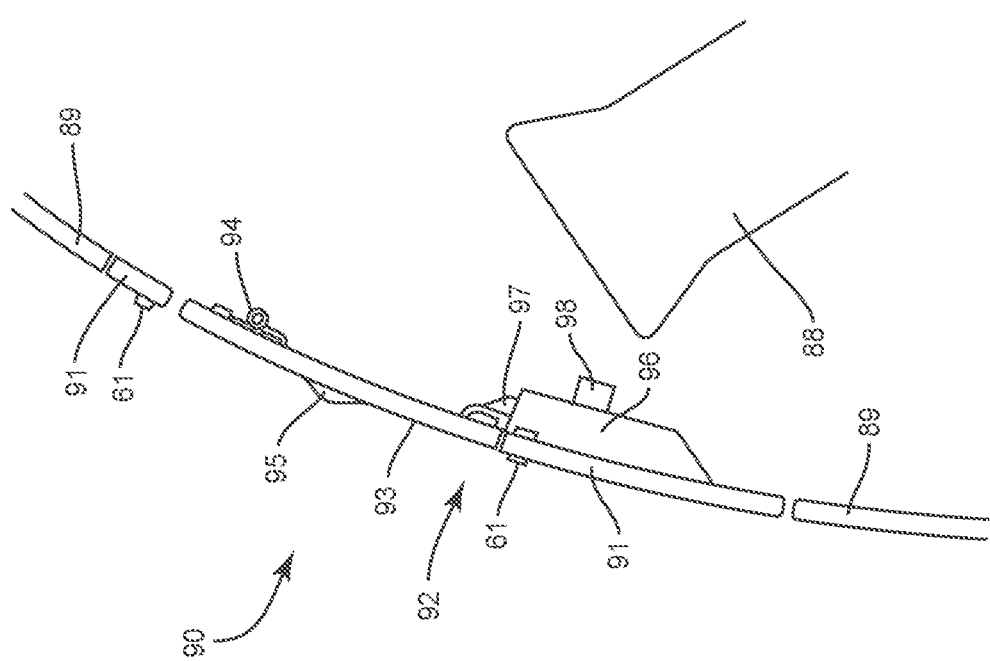
FIG. 7 is a schematic section view of a fuel door assembly mounted to a vehicle and positioned at an inlet to a fuel tank.

FIG. 6 illustrates a front view of the fuel door assembly 90 and FIG. 7 illustrates a side schematic view. The assembly 90 includes a body 91 that is connected to the vehicle body 89 with adhesives and/or mechanical fasteners. An opening 92 is positioned within a central section of the body 91 and contained within a perimeter of the body 91. The opening 92 aligns with the inlet 88 when the body 91 is connected to the vehicle body 89.

A door 93 is movably connected to the body 91. As illustrated in FIG. 7, a hinge 94 is positioned on the inner side of the body 91 and connected to the door 93. The hinge 94 can include a spring that biases the door 93 towards the closed position as illustrated in FIG. 7. In the closed position, the door 93 extends across the opening 92. This prevents unauthorized access to the inlet 88 to the exterior of the vehicle 20 and can prevent fuel from spilling from the inlet 88 to the exterior of the vehicle 20. This can also prevent/reduce fumes that can emanate from the fuel that is stored in the fuel tank 87. A seal (not illustrated) can be positioned between the door 93 and the inner side of the body 91 to further prevent leaks and/or fumes.

An extension 95 can extend outward from the exterior side of the door 93. The extension 95 can form a catch on which the nozzle 36 contacts when the nozzle 36 contacts against the door 93. The extension 95 facilitates and maintains the contact between the door 93 and the nozzle 36 to ensure that the door 93 is pushed inward to the open position by the nozzle 36.

A latch mechanism 96 can be mounted to the inner side of the body 91. The latch mechanism 96 includes an arm 97 that can extend across a portion of the door 93 when in a locked position. The locked position prevents the door 93 from pivoting about the hinge 94 inward towards an open position. As illustrated in FIG. 7, the latch mechanism 96 can be positioned at an opposing side of the door 93 from the hinge 94. In the open position, the arm 97 is retracted away from the door 93. This provides for the door 93 to pivot inward towards the open position when contacted by the nozzle 36.

The alignment system 60 provides for aligning the nozzle 36 of the fuel dispenser 30 with the door 93 and inlet 88 to dispense fuel to the fuel tank 87. The alignment system 60 includes lights 61 mounted on the body 91. The lights 61 are positioned at various points around the door 93. FIG. 6 includes four lights 61 positioned at different quadrants around the door 93 (i.e., lights spaced apart by 90° relative to a center of the door 93). Other designs include a greater number of lights 61 positioned at smaller increments relative to the door 93). Other designs include fewer lights 61. The lights 61 are sensed by one or more of the sensors 33 on the nozzle 36 to guide the nozzle 36 to the door 93 and into the inlet 88. Various kinds of lights 61 can be used. One design includes light emitting diodes (LEDs). The lights 61 can be adjusted between an on position in which light is emitted that is detected by the one or more sensors 33, and an off position in which no light is emitted.

The alignment system 60 can also include a photoreceptor 62. The photoreceptor 62 can detect a condition to turn on the lights 61 to initiate nozzle sensors 33 to drive the processor 70 to position and articulate the movable arm 32. The condition can include a light that is emitted from the nozzle 36, arm 32, and/or body 31 of the fuel dispenser 30. The photoreceptor 62 can also cause the lights 61 to turn off a predetermined period of time after the light is no longer detected.

The body 90 can be connected to the body 89 of the vehicle 20 in various manners. Mechanical fasteners can extend through the body 91 and into the vehicle body 89. The body 90 can include one or more wings that extend outward from the inner side. The one or more wings are positioned along an inner side of the vehicle body 89 and secured by mechanical fasteners and/or adhesives.

The fuel door assembly 90 can be equipped with a control unit 98 to operate the positioning. The control unit 98 can include a communication circuit that receives signals from the dispenser 30 to activate one or more of the latch mechanism 96, lights 61, and photoreceptor 62. The communication circuit can be configured to receive signals directly from the dispenser 30, such as through short-range communications such as Bluetooth or Near Field Communciations. The control unit 98 can include a power source, such as a battery to power one or more of the components of the fuel door assembly 90. The control unit 98 can also include one or more of the components of the communication circuit of the dispenser 30 to provide for communications.

As schematically illustrated in FIG. 5, the vehicle 20 can be equipped with a device 80 that signals the ignition state to the fuel dispenser 30. The device 80 can be a passive coil RF that is connected to the spark plug line in the vehicle 20 to detect a status of the ignition, such as on the spark plug line. The passive coil RF device 80 emits a specific RF signal when the ignition is on. The RF signal can be detected by the communication circuit 73 of the fuel dispenser 30. In one design, the communication circuit 73 includes a quarter wave antenna that is tuned to detect the RF signal emitted by the passive coil RF device 80. Alternatively or additionally, the control unit 98 of the fuel door assembly 90 can detect the signals from the device 80 and signal the fuel dispenser 30.

Alternatively or additionally, the vehicle 20 can be equipped with a transmitter that is powered through an ignition wire in the vehicle 20. When the ignition is on, the transmitter transmits a signal that is detected by the communication circuit 73 of the fuel dispenser 30 and is processed to determined that the vehicle 20 ignition is on and to cease and/or prevent fuel dispensing.

Figure 8:
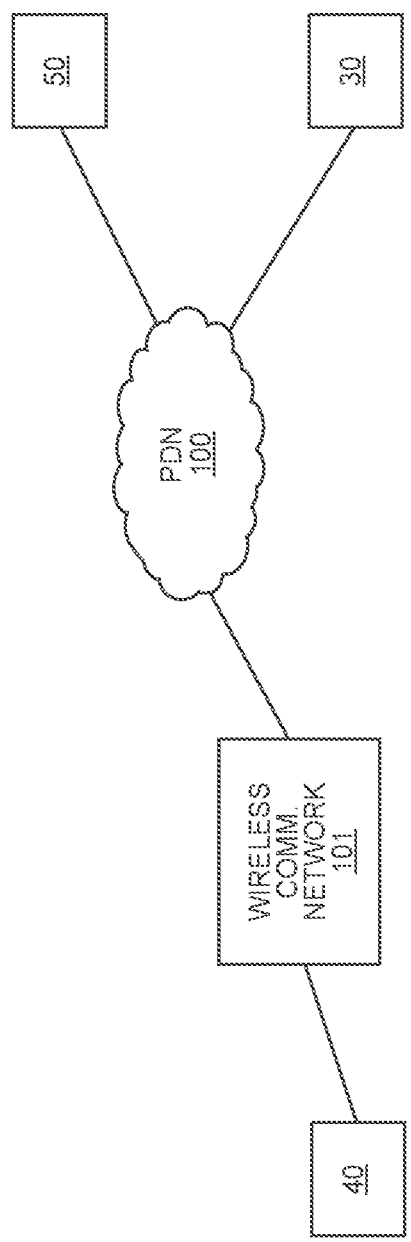
FIG. 8 is a schematic diagram of a network in which the user device and dispenser access the server.

The fuel dispensing system 10 can be configured for browser-based accessibility with communications through one or more networks. As illustrated in FIG. 8, the entities can communicate through a Packet Data Network (PDN) 100 that comprises a packet-switched network that implements conventional protocols, such as the suite of Internet protocols. The PDN 100 can comprise a public or private network, and may include one or more wide area or local area networks. One example of a PDN 100 is the Internet. The browser-based interface can include well-known browsers such as Internet Explorer and Mozilla Firefox, or can also include specific applications to communicate with the monitoring server 50 over the PDN 100 (e.g., a smartphone application). The user device 40 can access the PDN 100 through a wireless communication network 101, such as Global System for Mobile Communications (GSM), Long Term Evolution (LTE), etc. Although not illustrated in FIG. 8, the fuel dispenser 30 can likewise access the PDN 100 through a wireless communication network according to a defined standard.

The monitoring server 50 can be accessed by the user device 40 using a browser-based interface. The browser-based interface can include a website through which the contents of the database 54 can be accessible. Although the website can be hosted by the monitoring server 50, it can also be hosted at another location accessible through the PDN 100.

Figure 9:
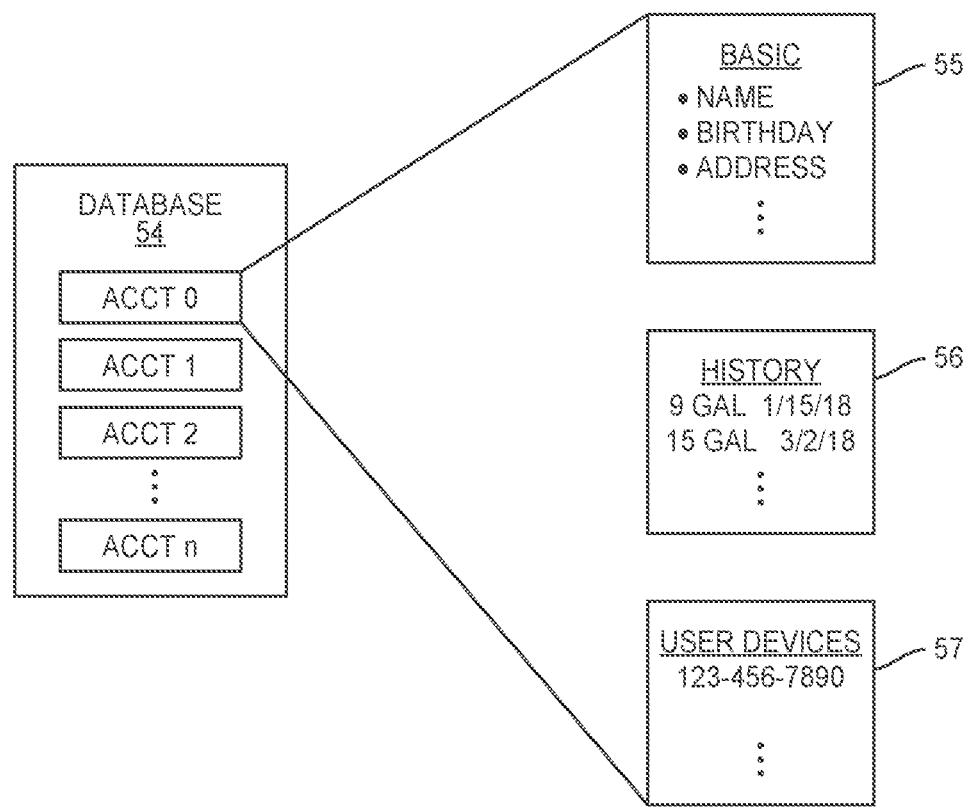
FIG. 9 is a schematic diagram of a structure of a user record in a database maintained by the server.

Prior to dispensing fuel, the user can establish an account. The account can be established through application software 59 that is downloaded and stored on the user device 40. The user can also establish the account by accessing the website hosted by the monitoring server 50. The account includes information about each user in the database 54. As illustrated in FIG. 9, the information can include basic information 55 such as name, birth date, email address, text number, home address, billing address, etc. This information 55 can be entered at the time the account is initially established, and may be updated as necessary. The information can also include sales transaction history 56 for the user and can include the date of the sale, the amount of fuel dispensed, the location of the fuel dispenser 30, etc. Each account can also include an identifier 57 for the one or more authorized user devices 40 that are permitted to order fuel. The identifiers 57 can include a telephone number, serial number, password, etc. that establishes the identity of the user. One or more of these identifiers 57 is authenticated by the monitoring server 50 prior to dispensing fuel. In the event that the one or more identifiers 57 are not authenticated, the device 40 attempting to receive fuel will be prevented from accessing the account and ordering the fuel. Further, the monitoring server 50 can notify the one or more legitimate user devices 40 regarding the attempted access to the account.

Figure 10:
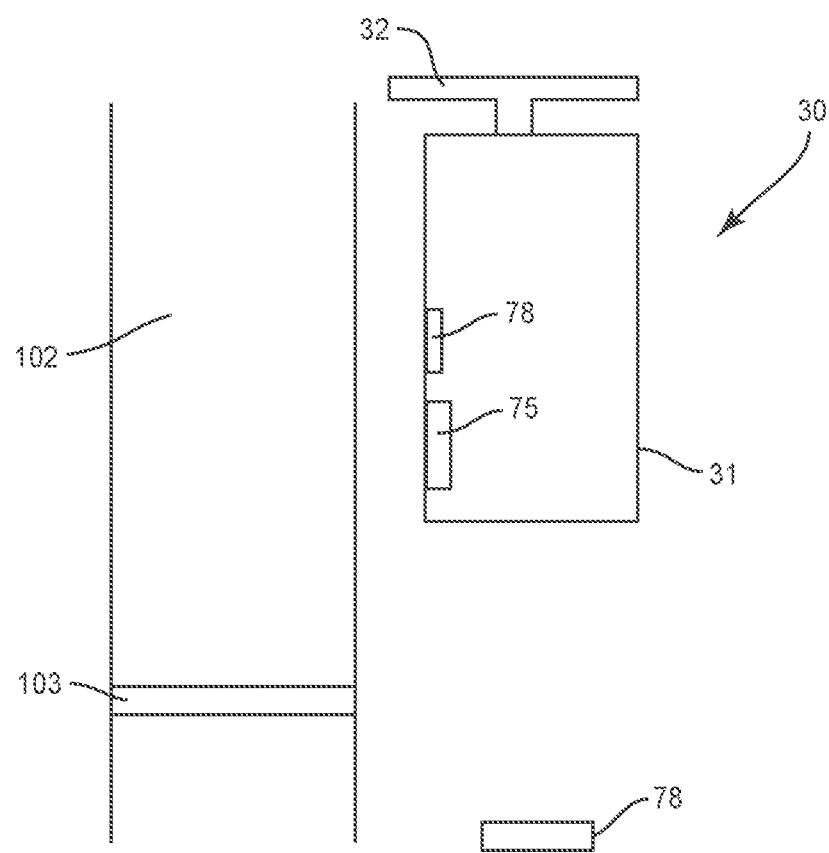
FIG. 10 is a schematic diagram of a dispenser positioned at a driving lane to accommodate a vehicle.

After a user account has been established, a fueling event can occur when a vehicle 20 approaches a fuel dispenser 30. FIG. 10 illustrates a driving lane 102 along which the vehicle 20 is moved prior to receiving the fuel. The driving lane 102 can include indicia 103 such as an alignment line 103 visually indicating to a user where a front of the vehicle 20 should be positioned to receive the fuel.

One or more sensors 78 are positioned to detect the location of the vehicle 20 as it moves along the driving lane 102 and the position of the vehicle 20 relative to the dispenser 30. Sensor 78 can be positioned in proximity to the fuel arm 32 to detect the photoreceptor 62 or other target on the fuel door assembly 90.

The display 75 and/or speaker 78 can provide instructions to the user as they move their vehicle 20 along the driving lane 102 and to inform the user when to stop movement. The fuel dispenser 30 is configured to stop the vehicle at a point along the driving lane 102 in which the fuel inlet 88 is in proximity to the arm 32 to allow for the autonomous fueling.

Figure 11:
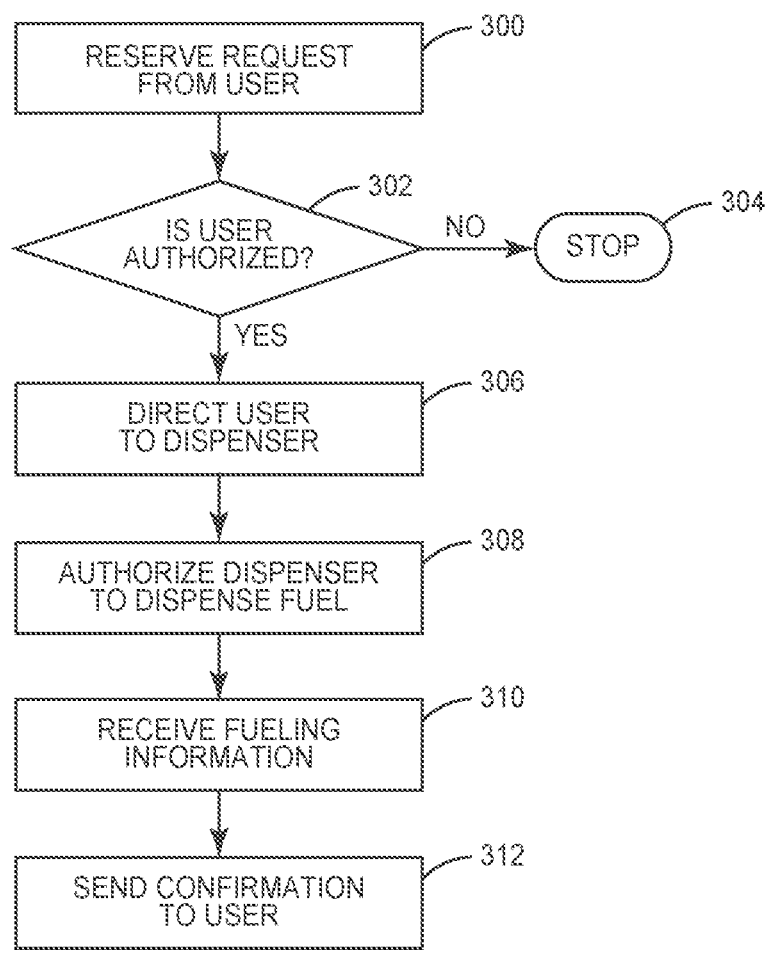
FIG. 11 is a flowchart diagram of a fueling method.

FIG. 11 illustrates a method of the server 50 implementing a fueling event. A request is received from a user device 40 indicating the need for fuel (block 300). The request can include identification information for the user, the current location of the user device 40, and the amount of needed fuel. The server 50 can initially determine if the user is authorized to receive fuel (block 302). If they are not, the process stops (block 304). A message can be sent to the user device 40 indicating the issue and requesting that the user correct the problem.

If the user is authorized, the server 50 can direct the user to the nearest dispenser 50 that is able to complete the request (block 306). The server 50 can receive the location of the user device 40 during the initial request and can determine an applicable dispenser 30. This can include the nearest dispenser 30 to the user at the time of the request. This can also include a home dispenser 30 from which the user normally receives fuel, or some other predetermined criteria. The server 50 can also authorize the dispenser 30 to dispense the fuel (block 308).

After the fuel is dispensed, the server 50 receives information from the dispenser 30 at the end of the fueling event (block 310). The information can include the amount of fuel dispensed to the vehicle, the date and time of the fueling event, and various other information that can be sensed by the dispenser 30 during the fueling such as the make and model of the vehicle. The server 50 can send a confirmation to the user verifying the information of the fueling event (block 312). The confirmation can include a message that is sent to the user device 40, or a message that is placed in the user's account.

Figure 12:
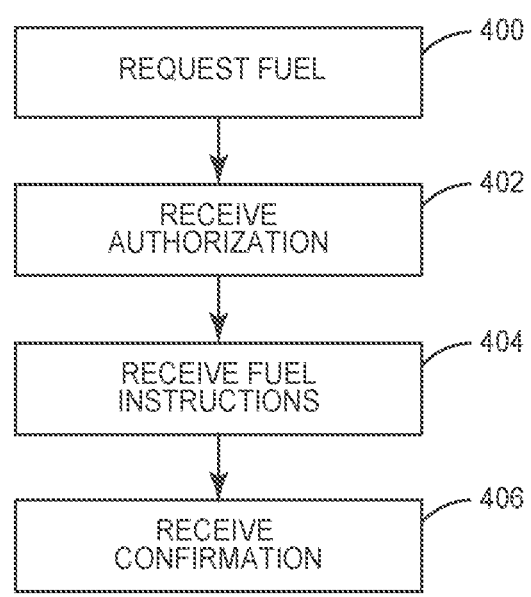
FIG. 12 is a flowchart diagram of a fueling method.

FIG. 12 illustrates a method of a user obtaining fuel. The user requests the fuel (block 400). The request can occur at the time the fuel is needed, or can be made at an earlier time. The request can indicate the time when the fuel is needed (e.g., immediately, within the next 6 hours, etc.). The request is made through the user device 40 and can be made to the server 50 or to the dispenser 30. After sending the request, the user receives an authorization (block 402). The authorization can include fuel instructions (block 404). The instructions can include the location of the dispenser 30 and a time range in which the fuel is to be received. Once the user vehicle 20 is at the dispenser 30, the instructions can also include more specific information, such as alignment positioning to ensure the vehicle 20 is positioned accurately relative to the dispenser 30 to receive the fuel. The instructions can also include that the vehicle 20 is to be turned off at all times while fuel is being dispensed. The instructions can be received from the server 50 and/or the dispenser 30.

After the fuel event, the user can receive confirmation of the fueling event (block 406). This can include one or more of the amount of fuel dispensed, the time the fuel was dispensed, and the total cost of the transaction. The confirmation can be received from one or both of the dispenser 30 and the server 50.

Figure 13:
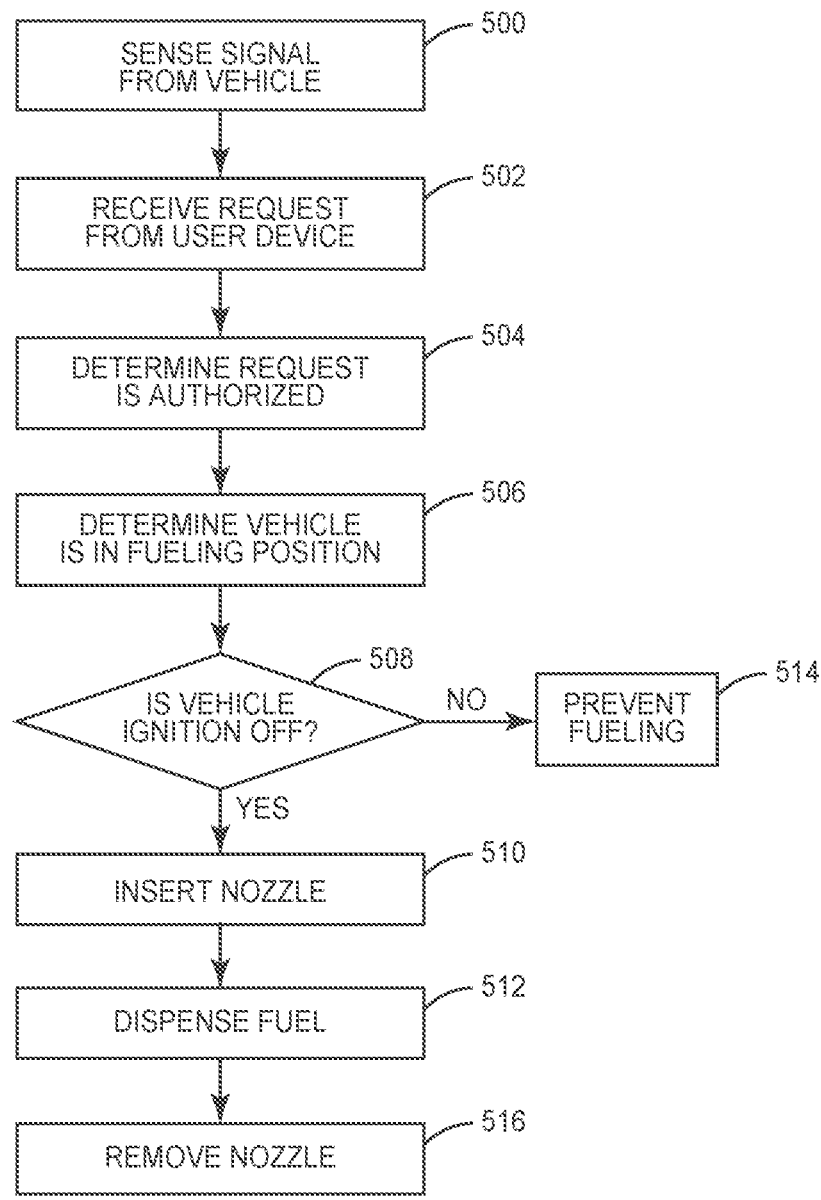
FIG. 13 is a flowchart diagram of a fueling method.

FIG. 13 includes a method performed by the dispenser 30 of dispensing fuel. The dispenser 30 senses the vehicle 20 is in proximity to the dispenser 30 (block 500). This can include receiving a signal from the user device 40 indicating that the vehicle ignition is on. Additionally or alternatively, this can include detecting the vehicle 20 through one or more sensors 78 in proximity to the dispenser 30.

The dispenser 30 also receives a request from the user device 40 (block 502). The request can be received from the user device 40 or from the sensor 50. The dispenser 30 then determines that the fueling event is authorized (block 504). This can be determined by the dispenser 30 based on information about the user stored in the memory circuit 72, or the authorization can be received from the server 50.

Once the fueling event is authorized, the dispenser 30 determines that the vehicle 20 is in fueling position relative to the dispenser 30 (block 506). The position of the vehicle 20 can be determined through one or more of the sensors 78 associated with the dispenser 30. The one or more sensors 33 on the nozzle 36 can also assist in positioning the vehicle 20. This can include activating the photoreceptor 62 on the fuel door assembly 90 which activate the lights 61 for sensing by the one or more sensors 33. During the positioning, instructions can be sent to the user through the user device 40 and/or on the display 75 or speaker 67 on the dispenser 30. Once the vehicle 20 is positioned, the dispenser 30 can send a signal to the fuel door assembly 90 to unlock the latch 96.

The dispenser 30 checks the status of the vehicle ignition (block 508). This can include sensing for the signal emitted by the device 80. In the event the signal is received, the dispenser 30 determines that the vehicle ignition is on and terminates the transaction (block 514).

If the vehicle ignition is off, the dispenser 30 extends the arm 32 and inserts the nozzle 36 through the opening 92 of the fuel door assembly 90 and into the inlet 88 of the fuel tank (block 510). The nozzle 36 can engage with the extension 95 on the face of the door 93 to catch and maintain the position. The movement of the arm 32 forces the door 93 to pivot inward and away from the opening 92 thus allow insertion of the nozzle 36. Once inserted, the one or more pumps 34 are activated and fuel is dispensed (block 512).

During this process, the dispenser 30 continues to ensure that the vehicle ignition is off (block 508). This can include sensing for the signal emitted by the device 80. In the event the signal is received, the dispenser 30 determines that the vehicle ignition is on and terminates the fuel dispensing.

While the vehicle ignition is off, fuel is dispensed to the vehicle 20. Once the requested amount of fuel is dispensed (or the dispenser 30 detects that the vehicle is full of fuel), the pump 34 is deactivated. The nozzle 36 is removed from the inlet 88 and moved away from the door 93 of the fuel door assembly 90 (block 516). This causes the door 93 to pivot back across the opening 92. The door 93 can be secured in the closed position by the latch 96. The arm 32 of the dispenser 30 is returned to the home position. The dispenser 30 can signal to the user that the vehicle 20 can be driven away from the dispenser 30.

Figure 14:
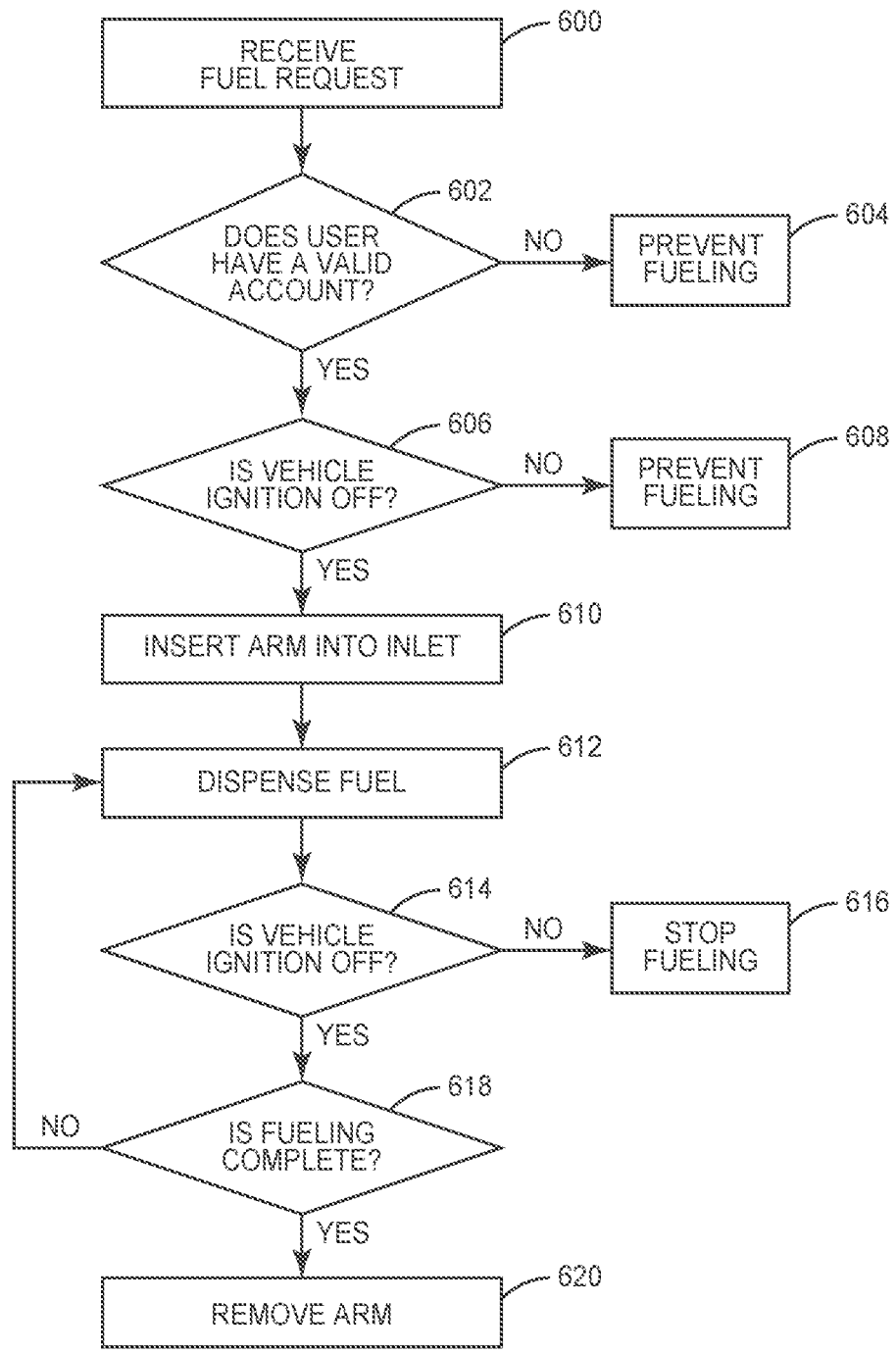
FIG. 14 is a flowchart diagram of a fueling method.

FIG. 14 illustrates a method of fueling a vehicle 20. A fuel request is received at the monitoring server 50 from the user device 40 (block 600). The fuel request can be received directly from the user device 40. Additionally or alternatively, the fuel request could be initially sent from the user device 40 to the fuel dispenser 30, subsequently followed by the fuel dispenser 30 transmitting the request to the monitoring server 50. The fuel request can include various identifying information to access the user account, as well as specific aspects of the actual fuel dispensing such as type of fuel and amount of fuel.

The monitoring server 50 receives the request and determines whether the user has a valid account (block 602). If there is not a valid account, fuel dispensing is prevented (block 604). A message can be sent to the user device indicating the issue and providing instructions for the user to fix the issue to allow for fueling.

Prior to dispensing fuel, the fuel dispenser 30 verifies that the vehicle ignition is off (block 606). For a vehicle 20 equipped with a device 80, the fuel dispenser 30 can monitor for the RF signal indicating that the ignition is on. Additionally or alternatively, the fuel dispenser 30 can receive a signal from a vehicle processing circuit verifying that the ignition is off. If the ignition is on, fuel is not dispensed (block 608). A message can be sent to the user device 40 and/or a message displayed on the fuel dispenser display 75 instructing the user to shut off the ignition. The state of the ignition can be checked for a period of time to determine if it is shut off. After the time period, the transaction can be permanently stopped.

When the ignition is off, the fuel dispensing can occur. The fuel dispenser 30 sends a signal to release the latch 96 and move the arm 97 away from the door 93. Because of the biasing force of the spring at the hinge 94, the door 93 remains in the closed position and extends across the opening 92 in the body 91. The fuel nozzle 36 is then moved into contact with the door 93. The alignment of the fuel nozzle 36 is controlled through the one or more sensors 33 detecting the one or more lights 61 at the door 93. Once the nozzle 36 is aligned, the nozzle 36 moves into contact with the door 93. The contact and movement of the nozzle 36 causes the door 93 to pivot about the hinge 94 away from the opening 92 and towards the open position. This provides for the nozzle 36 to be inserted through the opening 92 and into the inlet 88 (block 610). Once inserted, fuel is pumped through the arm 32 and nozzle 36 and into the fuel tank 87 (block 612).

During the fueling process, the fuel dispenser 30 monitors the status to ensure that the vehicle ignition remains off (block 614). If the ignition is turned on during fueling, dispensing of the fuel is stopped (block 616). The user can be notified about the ignition through one or more of a message sent to the user device 40, a message placed on the display 75, or an audio message through the speaker 79. Fuel dispensing can restart if the ignition is shut off within a predetermined time period. If the ignition remains on, the fueling event is terminated.

When the vehicle ignition remains off, the fuel dispensing continues until the fueling is complete (block 618). This can occur when the fuel dispenser 30 determines that the fuel tank 87 is full or when the desired amount of fuel has been dispensed. After the fuel dispensing in complete, the arm 32 of the fuel dispenser 30 is autonomously retracted with the nozzle 36 moving away from the vehicle 20 (block 620). This causes the door 93 to pivot back to the closed position across the opening 92. The latch 96 can then be signaled to move the arm 97 to secure the door 93 in the closed position.

The fuel filler door assembly 90 can be installed on an existing vehicle 20 (i.e., retrofit an existing vehicle). This can include removing the existing fuel door from the vehicle 20. The body 91 can be the same size of the fuel door and extend across the fuel door space. The body 91 is positioned on the vehicle 20 with the opening 92 aligned with the inlet 88 of the fuel tank 87. Once aligned, the body 91 can be secured to the vehicle 20. This can include inserting one or more fasteners through the body 91 and into the body of the vehicle 20. Once mounted on the vehicle 20, the fuel filler door assembly 90 can be operated as described above.

In one example, a self-sealing fuel cap is positioned at the fuel inlet 88. The fuel cap is designed to assist and permit the insertion of the distal end of the fuel nozzle 36 into the inlet 88 without removing the self-sealing cap. This self-sealing fuel cap can have a funnel shaped opening to guide the nozzle 36 during insertion. The fuel cap can include a spring-assisted door that is biased closed but can be opened during contact with the nozzle 36. During fueling, the nozzle 36 is inserted through the fuel cap and into the fuel inlet 88 to deliver fuel into the fuel tank 87. The self-sealing fuel cap maintains the required tank vacuum and fuel vapor control to prevent fumes that can emanate from the fuel that is stored in the fuel tank 87 and/or fuel inlet 88.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of autonomously dispensing fuel to a vehicle, the method comprising:
   providing a fuel door assembly that is configured to be attached to the vehicle, the fuel door assembly comprising:
   a body sized to extend across a fuel inlet of the vehicle with the body comprising
   an opening that is aligned with the fuel inlet;
   a door movably connected to the body; and
   lights mounted on the body and positioned at a variety of points around the door;
   receiving a wireless request for fuel from a user;
   determining that the user has a valid account;
   determining that the vehicle ignition is off;
   in response to determining that the vehicle ignition is off, extending a fuel arm outward from a dispenser body, sensing the lights that are positioned around the door, aligning the fuel arm with the door based on the lights, and inserting a nozzle on the fuel arm through the opening in the body into the fuel inlet on the vehicle;

activating a pump and dispensing the fuel from a tank located in the dispenser body to the vehicle while the vehicle ignition is off;

deactivating the pump after the fuel is moved through the fuel arm and into the vehicle; and retracting the arm towards the dispenser body and removing the nozzle from the fuel inlet of the vehicle.

2. The method of claim 1, further comprising detecting that the ignition of the vehicle is turned on while the nozzle is inserted into the fuel inlet and terminating the dispensing of fuel.

3. The method of claim 1, further comprising receiving a signal from a passive coil RF device that is connected to a spark plug line of the vehicle and determining that the vehicle ignition is on.

4. The method of claim 3, further comprising receiving the signal from the passive coil RF device through a quarter wave antenna.

5. The method of claim 1, further comprising receiving signals from a control unit of a fuel door assembly on the vehicle and determining that the vehicle ignition is off.

6. The method of claim 1, further comprising sensing that the vehicle is in proximity to the dispenser by receiving a signal from the vehicle that the vehicle ignition is on.

7. The method of claim 1, further comprising sensing the lights on a fuel door assembly of the vehicle and determining a position of the vehicle relative to the dispenser.

8. The method of claim 1, further comprising:

extending the fuel arm outward from a main dispenser;

engaging the nozzle of the fuel arm with an extension that extends outward from the door of the body of the fuel door assembly; and inserting the fuel arm through the door of the fuel door assembly and into the fuel inlet of the vehicle.

9. A method of autonomously dispensing fuel to a vehicle, the method comprising:

receiving a wireless request at a fuel dispenser for fuel for a vehicle that is positioned in proximity to the fuel dispenser, the fuel dispenser comprising a dispenser body, a movable fuel arm attached to the dispenser body, a fuel tank positioned in the dispenser body, and a pump positioned in the dispenser body to pump the fuel from the fuel tank and through the fuel arm;

receiving signals through a quarter wave antenna in the fuel dispenser from a passive coil RF device that is connected to a spark plug line of the vehicle;

determining that the vehicle ignition is off based on the signals;

sensing lights that are positioned on a body of a fuel door assembly that is mounted to the vehicle, the lights positioned around a door of the fuel door assembly;

based on the sensed lights, aligning the fuel arm with the door that is pivotally mounted to the body;

contacting the fuel arm against the door and pivoting the door inward relative to the body; and dispensing fuel from the tank in the dispenser body and through the fuel arm of the dispenser and into the vehicle.

10. The method of claim 9, further comprising in response to determining that the vehicle ignition is off, extending the fuel arm of the fuel dispenser from the dispenser body and inserting a nozzle on the fuel arm through an opening in the body and into a fuel inlet on the vehicle.

11. The method of claim 9, further comprising while dispensing fuel through the fuel arm and into the vehicle, determining based on the signals that the ignition is on and stopping the dispensing of fuel.

12. The method of claim 9, further comprising activating the pump in the fuel dispenser after determining that the vehicle ignition is off and dispensing fuel through the fuel arm and into the vehicle.

13. The method of claim 9, wherein receiving the wireless request at the fuel dispenser for fuel for the vehicle that is positioned in proximity to the fuel dispenser comprises receiving the request from a user device that is separate from the vehicle.

14. A system to autonomously dispense fuel to a vehicle, the system comprising:

a fuel door assembly configured to be retrofit to the vehicle, the fuel door assembly comprising:

a body configured to be mounted to the vehicle and sized to extend across a fuel inlet of the vehicle;

an opening in the body configured to align with the fuel inlet;

a door movably connected to the body at the opening; and lights mounted on the body and positioned at a variety of points around the door;

a dispenser comprising:

a dispenser body;

a fuel tank positioned in the dispenser body;

a fuel arm movably connected to the dispenser body, the fuel arm comprising a nozzle; and a pump positioned in the dispenser body to move the fuel from the fuel tank and through the fuel arm;

a processing unit positioned within the dispenser body and configured to:

receive a wireless request for fuel from a user;

determine that the vehicle ignition is off;

sense the lights;

based on the lights, align the fuel arm with the door that is pivotally mounted to the body;

extend the fuel arm outward from the dispenser body, contact the fuel arm against the door and pivot the door inward, and insert the nozzle into a fuel inlet on the vehicle;

activate the pump and dispense the fuel through the fuel arm; and deactivate the pump and retract the fuel arm towards the dispenser body upon determining that the ignition of the vehicle is turned on.

15. The system of claim 14, further comprising a quarter wave antenna positioned with the dispenser body, the quarter wave antenna configured to receive a signal from a passive coil RF device in the vehicle when the ignition of the vehicle is on.

16. The system of claim 14, further comprising a sensor mounted on the fuel arm, the sensor configured to detect lights on the fuel door assembly of the vehicle.

17. The system of claim 14, further comprising sensors mounted on the dispenser body, the sensors configured to sense a position of the vehicle.

18. The system of claim 16, wherein the lights are spaced evenly a part around the opening in the body of the fuel door assembly.

19. The system of claim 14, further comprising an extension that extends outward from a surface of the door to form a catch that is contacted by the nozzle of the dispenser.

20. The system of claim 14, wherein the opening is positioned within a central area of the body and away from perimeter edges of the body.

* * * * *